US008452425B2

(12) United States Patent
Kawazu et al.

(10) Patent No.: US 8,452,425 B2
(45) Date of Patent: May 28, 2013

(54) POSITION CONTROL DEVICE

(75) Inventors: Yuji Kawazu, Aichi (JP); Tomohisa Kameyama, Aichi (JP)

(73) Assignee: Okuma Corporation, Aichi (JP)

( * ) Notice: Subject to any disclaimer, the term of this patent is extended or adjusted under 35 U.S.C. 154(b) by 220 days.

(21) Appl. No.: 13/071,642

(22) Filed: Mar. 25, 2011

(65) Prior Publication Data

US 2011/0238221 A1  Sep. 29, 2011

(30) Foreign Application Priority Data

Mar. 25, 2010 (JP) .................................. 2010-70635

(51) Int. Cl.
| | |
|---|---|
| B61C 15/08 | (2006.01) |
| G05B 11/01 | (2006.01) |
| G05B 13/02 | (2006.01) |
| G05B 15/00 | (2006.01) |
| G06F 19/00 | (2006.01) |

(52) U.S. Cl.
USPC .................. 700/56; 318/52; 700/23; 700/28; 700/37; 700/44; 700/45; 700/85; 700/135; 700/193

(58) Field of Classification Search
USPC ................ 318/52; 700/23, 28, 37, 44–45, 56, 700/85, 135, 193
See application file for complete search history.

(56) References Cited

U.S. PATENT DOCUMENTS

| | | | | | |
|---|---|---|---|---|---|
| 3,658,388 | A | * | 4/1972 | Hasegawa | ...................... 303/171 |
| 5,157,597 | A | * | 10/1992 | Iwashita | ......................... 700/37 |
| 5,198,984 | A | * | 3/1993 | Yamaguchi et al. | .......... 700/188 |
| 5,335,178 | A | * | 8/1994 | Schafer et al. | .................. 701/82 |
| 5,627,750 | A | * | 5/1997 | Kono et al. | ...................... 701/67 |
| 5,691,614 | A | * | 11/1997 | Takeishi | ........................ 318/561 |
| 5,706,000 | A | * | 1/1998 | Fukuzaki et al. | .................. 341/5 |
| 6,577,908 | B1 | * | 6/2003 | Wojsznis et al. | ................ 700/42 |
| 6,662,073 | B1 | * | 12/2003 | Fujishima et al. | ............ 700/173 |
| 7,026,779 | B2 | * | 4/2006 | Eba | .............................. 318/609 |
| 7,560,891 | B2 | * | 7/2009 | Shibata et al. | ................ 318/632 |
| 8,082,048 | B2 | * | 12/2011 | Eguchi | ............................ 700/70 |
| 2005/0052149 | A1 | * | 3/2005 | Kameyama | ................... 318/600 |
| 2006/0069454 | A1 | * | 3/2006 | Burnham | ........................ 700/45 |
| 2008/0169778 | A1 | * | 7/2008 | Eguchi | ............................ 318/561 |
| 2009/0171594 | A1 | * | 7/2009 | Norihisa | ......................... 702/34 |

FOREIGN PATENT DOCUMENTS

| | | |
|---|---|---|
| EP | 1143316 A1 * | 10/2001 |
| JP | 2005-85074 A | 3/2005 |

* cited by examiner

*Primary Examiner* — Kavita Padmanabhan
*Assistant Examiner* — Thomas Stevens
(74) *Attorney, Agent, or Firm* — McCarter & English, LLP

(57) ABSTRACT

A position control device for suppressing occurrence of stick-slip during a feed operation performed in a very low speed region is provided. Adders add an output obtained by multiplying actual speed deviation by a proportional gain, an integral component of actual speed deviation obtained by inputting actual speed deviation to an integral compensator, an output obtained by multiplying motor speed deviation by a proportional gain, and an integral component of the motor speed deviation obtained by inputting motor speed deviation to an integral compensator. The result is output as a torque feedback command. Each integral compensator has a coefficient changer capable of changing a coefficient from 0 to 1 to adjust integral gains in accordance with a speed feedforward command or a speed command. Large integral gain increases the response speed of switching from static to kinetic friction torque in a very low speed region thereby suppressing occurrence of stick-slip.

2 Claims, 3 Drawing Sheets

POSITION CONTROL DEVICE

CROSS-REFERENCE TO RELATED APPLICATIONS

This application claims priority to Japanese Patent Application No. 2010-070635, filed on Mar. 25, 2010, which is incorporated herein by reference in its entirety.

BACKGROUND

1. Technical Field

The present invention relates to a position control device for a feed shaft (a table) such as those of machine tools.

2. Related Art

For full-closed control systems in which a linear scale is attached to a movable portion of a machine tool, when the movable portion is fed in a very low speed region, stick-slip occurs due to friction or elastic deformation. In order to reduce the influence of stick-slip, attempts have been made to reduce overshoot by setting high gains for a speed loop and a position loop.

FIG. 5 is a block diagram showing full-closed control in a related-art position control device. A first position detector 17 is attached to a motor 18. A differentiator 12 differentiates a position detection value Ym detected by the first position detector 17, and outputs a speed detection value Vm of the motor 18.

A position command Rc input from a host device is input to a differentiator 8 and a subtractor 1. The differentiator 8 differentiates the position command Rc, and outputs the result as a speed feedforward command Vr. The speed feedforward command Vr is differentiated by a differentiator 10, and then multiplied by a torque feedforward coefficient Ka, and the result is output as a torque feedforward command Tff.

A second position detector 21 is attached to a rotating table 19 (a feed shaft) which is driven by the motor. A position detection value Yl detected by the second position detector 21 is input to the subtractor 1 and a differentiator 11. The subtractor 1 subtracts, from the position command Rc, the position detection value Yl detected by the second position detector 21, and outputs a positional deviation Ep. An adder adds an output obtained by multiplying the positional deviation Ep by a position loop gain Kp, and the speed feedforward command Vr, and outputs a speed command Vc. A subtractor 3 subtracts, from the speed command Vc, the speed detection value Vm of the motor 18, and outputs a motor speed deviation Em.

The differentiator 11 differentiates the position detection value Yl detected by the second position detector 21, and outputs a speed detection value Vl of the rotating table 19. A subtractor 4 subtracts the speed detection value Vl of the rotating table 19 from the speed feedforward command Vr, and outputs an actual speed deviation El.

An adder 5 adds an output obtained by multiplying the actual speed deviation El by a proportional gain Pl, an output obtained by multiplying the motor speed deviation Em by a proportional gain Pm, and an output obtained by inputting the motor speed deviation Em to an integral compensator 9, and outputs a torque feedback command Tfb.

An adder 6 adds the torque feedforward command Tff and the torque feedback command Tfb, and outputs a torque command Tc. Reference numeral 15 in FIG. 5 represents various filter units for filtering the torque command and current control units.

For feed shafts having a slide surface that is slidably guided, or main shafts that are caused to rotate under braking, there are problems in that when they are operated in a very low speed region, stick-slip occurs due to friction or elastic deformation, and the machining accuracy degrades. In the related art shown in FIG. 5, even when the control target is a large-scale machine in which lost motion including a loose ball screw or flexure of a belt is present, by feeding back a speed vl of the rotating table to the speed loop, it is made possible to set the position loop gain to be high, and the follow-up properties are dramatically improved. However, if static friction is large relative to kinetic friction, stick-slip in which a standstill and an overshoot are repeated occurs in a very low speed region.

By setting an integral gain to be large, or by shortening an integral time constant to increase the response speed of switching from static friction torque to kinetic friction torque, it may be possible to suppress occurrence of stick-slip. However, when an integral gain is set to be large, or an integral time constant is shortened, during an operation in which the acceleration increases, such as, for example, in cases where a large speed command is made, the influence of a lost motion becomes large, and mechanical vibrations occur.

SUMMARY

The present invention was made in consideration of the foregoing problems. According to one aspect of the present invention, there is provided a position control device for controlling a position of a feed shaft based on an output of a first position detector connected to a motor and an output of a second position detector connected to the feed shaft driven by the motor, the position control device comprising a position calculator for outputting a speed feedback command obtained from a difference between a position command and the output of the second position detector; a position command differentiator for differentiating the position command to output a speed feedforward command; a first subtractor for outputting an actual speed deviation which is a difference between the speed feedforward command and an actual speed of the feed shaft obtained from the output of the second position detector; a first proportional calculator for performing proportional calculation of the actual speed deviation; a first integral compensator for integrating the actual speed deviation; a first adder for adding the speed feedforward command and the speed feedback command to output a speed command; a second subtractor for outputting a motor speed deviation which is a difference between the speed command and a motor speed obtained from the output of the first position detector; a second proportional calculator for performing proportional calculation of the motor speed deviation; a second integral compensator for integrating the motor speed deviation; and a second adder for adding an output of the first proportional calculator, an output of the second proportional calculator, an output of the first integral compensator, and an output of the second integral compensator to output a torque command, wherein each of the first and second integral compensators comprises a coefficient changer capable of changing a coefficient in accordance with the speed feedforward command or the speed command.

With the position control device according to the present invention, by setting an integral gain Kl to be large to increase the response speed of switching from static friction torque to kinetic friction torque in a very low speed region in which the influence of a lost motion is small, it is possible to suppress occurrence of stick-slip.

DETAILED DESCRIPTION

Figure 1:
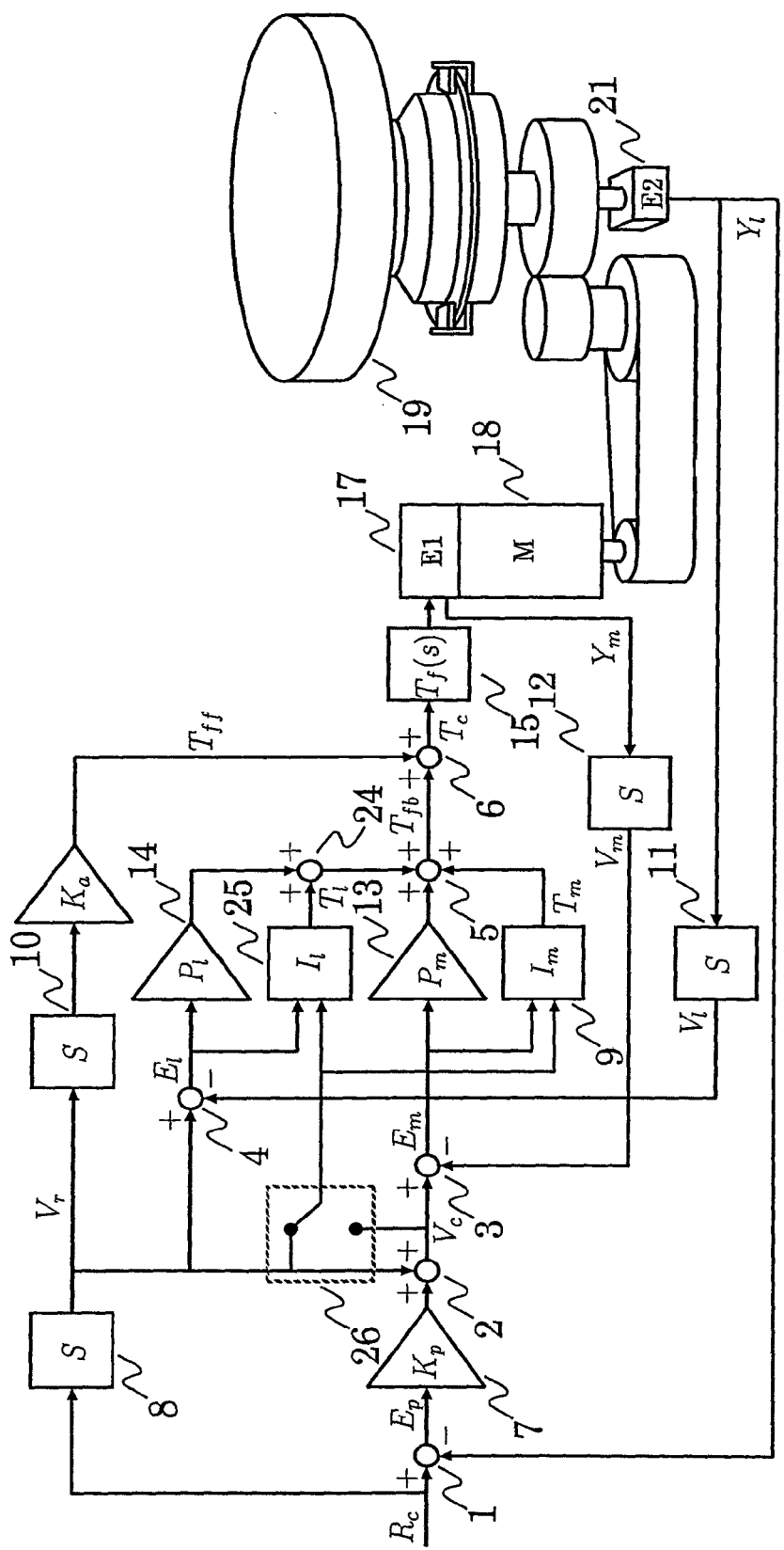
FIG. 1 is a control block diagram of a position control device according to an embodiment of the present invention.

A position control device according to an embodiment of the present invention will be described below. The same elements as those described in the related-art example are denoted by the same reference numerals in the accompanying drawings, and their description is not repeated here. FIG. 1 shows a control block diagram of a position control device according to an embodiment of the present invention.

A first position detector 17 is attached to a motor 18. A differentiator 12 differentiates a position detection value Ym detected by the first position detector 17, and outputs a speed detection value Vm of the motor 18.

A position command Rc input from a host device is input to a differentiator 8 and a subtractor 1. The differentiator 8 serving as a position command differentiator differentiates the position command Rc, and outputs the result as a speed feedforward command Vr. The speed feedforward command Vr is differentiated by a differentiator 10, and then multiplied by a torque feedforward coefficient Ka, and the result is output as a torque feedforward command Tff.

A second position detector 21 is attached to a rotating table 19 (a feed shaft) which is driven by the motor. A position detection value Yl detected by the second position detector 21 is input to the subtractor 1 and a differentiator 11. The subtractor 1 subtracts the position detection value Yl detected by the second position detector 21 from the position command Rc, and outputs a positional deviation Ep. A calculator 7 serves as a position calculator that multiplies the positional deviation Ep by a position loop gain Kp, and outputs a speed feedback command. An adder 2 (a first adder) adds an output (a speed feedback command) obtained by multiplying the positional deviation Ep by a position loop gain Kp to the speed feedforward command Vr, and outputs a speed command Vc. A subtractor 3 (a second subtractor) subtracts the speed detection value Vm of the motor 18 from the speed command Vc, and outputs a motor speed deviation Em.

The differentiator 11 differentiates the position detection value Yl detected by the second position detector 21, and outputs a speed detection value Vl of the rotating table 19. A subtractor 4 (a first subtractor) subtracts the speed detection value Vl of the rotating table 19 from the speed feedforward command Vr, and outputs an actual speed deviation El.

A calculator 14 (a first proportional calculator) performs proportional calculation in which the actual speed deviation El is multiplied by a proportional gain Pl. An integral compensator 25 (a first integral compensator) integrates the actual speed deviation El, and outputs an integral component Tl of the actual speed deviation. A calculator 13 (a second proportional calculator) performs proportional calculation in which the motor speed deviation Em is multiplied by a proportional gain Pm. An integral compensator 9 (a second integral compensator) integrates the motor speed deviation Em, and outputs an integral component Tm of the motor speed deviation Em.

An adder 5 and an adder 24 serve as a second adder that outputs a torque command Tfb. Specifically, the adder 24 adds an output from the calculator 14, which is obtained by multiplying the actual speed deviation El by the proportional gain Pl, to the integral component Tl of the actual speed deviation which is an output from the integral compensator 25. The adder 5 adds an output from the adder 24, the integral component Tm of the motor speed deviation which is output from the integral compensator 9, and an output from the calculator 13 which is obtained by multiplying the motor speed deviation Em by the proportional gain Pm, and outputs the result as a torque feedback command Tfb. An adder 6 adds the torque feedback command Tfb and the torque feedforward command Tff, and outputs the result as a torque command Tc.

Figure 2:
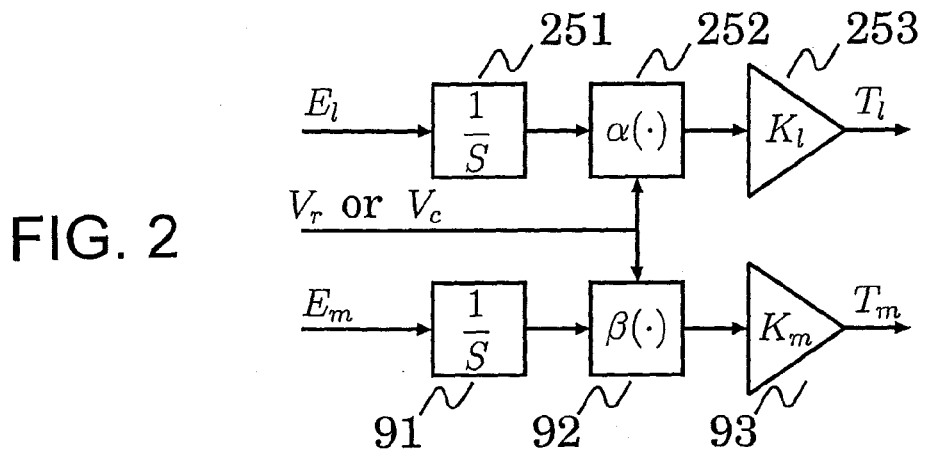
FIG. 2 is a block diagram showing integral compensators.

Next, the integral compensator 9 and the integral compensator 25 will be described with reference to FIG. 2. FIG. 2 is a detailed block diagram of the integral compensator 9 and the integral compensator 25. In FIG. 2, an integral calculator 91 is an integrator which outputs an integral value of the motor speed deviation Em. The integral value of the motor speed deviation Em is multiplied by a coefficient $\beta$ represented by reference numeral 92 and an integral gain Km represented by reference numeral 93, and the result is output as the integral component Tm of the motor speed deviation.

An integral calculator 251 is an integrator which outputs an integral value of the actual speed deviation El. The integral value of the actual speed deviation El is multiplied by a coefficient $\alpha$ represented by reference numeral 252, and an integral gain Kl represented by reference numeral 253, and the result is output as the integral component Tl of the actual speed deviation.

Figure 3:
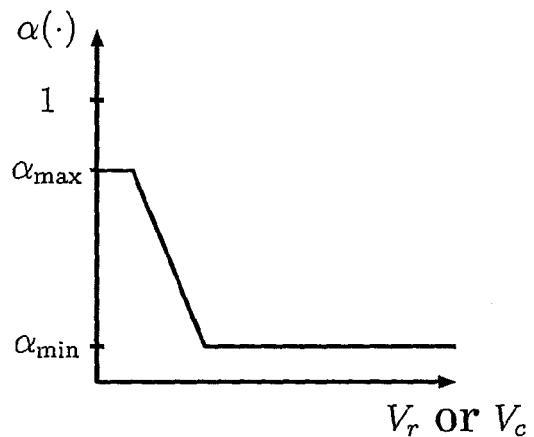
FIG. 3 is a pattern diagram of a coefficient for a control target side speed loop integral compensator.

Here, the coefficient $\alpha$ and the coefficient $\beta$ are variable values varying from 0 to 1 in accordance with the value of the speed feedforward command Vr or the speed command Vc. The coefficient $\alpha$ assumes a value $\alpha$max which is close to 1 when the speed feedforward command Vr or the speed command Vc is small, and assumes a value $\alpha$min which is close to 0 when the speed feedforward command Vr or the speed command Vc is large. FIG. 3 shows an example of a variable pattern of the coefficient $\alpha$. As shown in FIG. 3, when it is assumed that the relationship 0<a1<a2 holds, the coefficient $\alpha$ assumes the maximum value $\alpha$max when Vr (or Vc)<a1. When a1$\leq$Vr (or Vc)$\leq$a2, the coefficient $\alpha$ gradually (proportionally) decreases from the maximum value $\alpha$max to the minimum value $\alpha$min. When a2<Vr (or Vc), the coefficient $\alpha$ assumes the minimum value $\alpha$min. In other words, it can be said that the integral compensator 25 has a coefficient changer for changing the coefficient such that the coefficient increases as the speed feedforward command Vr or the speed command Vc decreases.

Figure 4:
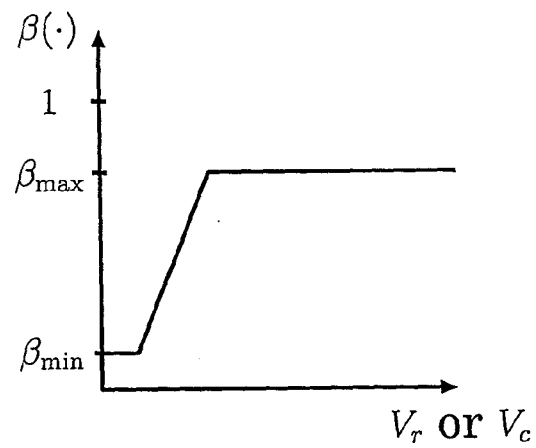
FIG. 4 is a pattern diagram of a coefficient for a motor side speed loop integral compensator.

Similarly, the coefficient $\beta$ assumes a value $\beta$max which is close to 1 when the speed feedforward command Vr or the speed command Vc is large, and assumes a value $\beta$min which is close to 0 when the speed feedforward command Vr or the speed command Vc is small. FIG. 4 shows an example of a variable pattern of the coefficient $\beta$. As shown in FIG. 4, when it is assumed that the relationship 0<b1<b2 holds, the coefficient $\beta$ assumes the minimum value $\beta$min when Vr (or Vc)<b1. When b1$\leq$Vr (or Vc)$\leq$b2, the coefficient $\beta$ gradually (proportionally) increases from the minimum value $\beta$min to the maximum value $\beta$max. When b2<Vr (or Vc), the coefficient $\beta$ assumes the maximum value $\beta$max. In other words, it can be said that the integral compensator 9 has a coefficient changer for changing the coefficient $\beta$ such that the coefficient increases as the speed feedforward command Vr or the speed command Vc increases. Whether the coefficient $\alpha$ and the coefficient $\beta$ are changed in accordance with the speed feedforward command Vr or in accordance with the speed command Vc is selectable by switching a switch 26.

Figure 5:
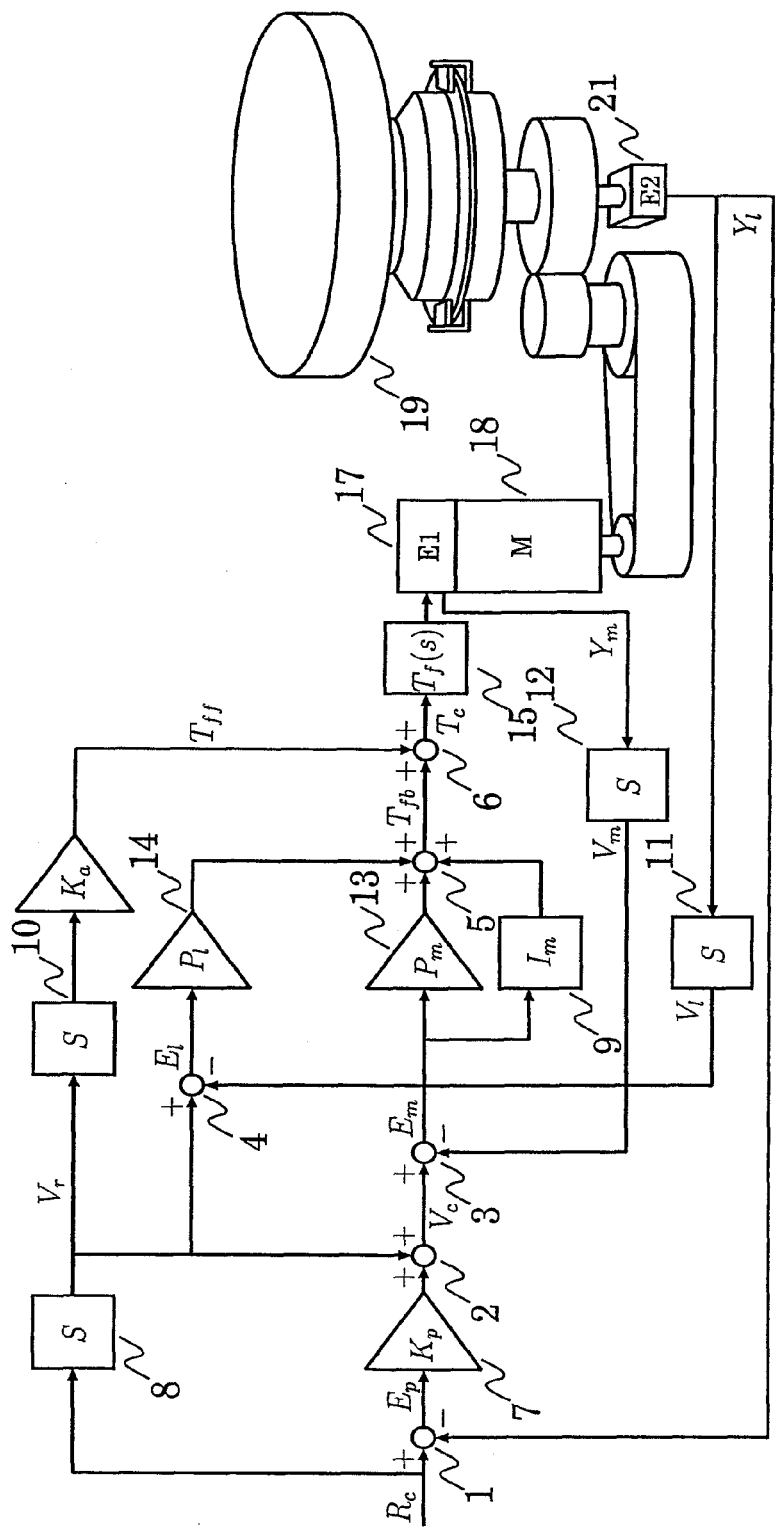
FIG. 5 is a control block diagram of a related-art position control device.

Here, in the related art as shown in FIG. 5, by feeding back a speed Vl of the rotating table to the speed loop, it is made possible to set a high position loop gain Kp, and it is made possible to significantly reduce the steady-state deviation. However, if static friction is large relative to kinetic friction, stick-slip in which a standstill and an overshoot are repeated occurs in a very low speed region. By setting an integral gain to be large, or by shortening an integral time constant to increase the response speed of switching from static friction torque to kinetic friction torque, it may be possible to suppress occurrence of such stick-slip. However, there are problems in that during an operation in which the acceleration increases, such as, for example, in cases where a large speed command is made, the influence of a lost motion becomes large, and mechanical vibrations occur. In the above-described embodiment, the integral compensator 25 for the actual speed deviation El is provided, so that it is made possible to directly reduce the actual speed deviation El. As a result of changing the coefficient $\alpha$ and the coefficient $\beta$ as shown in FIGS. 3 and 4 in a very low speed region in which the speed feedforward command Vr or the speed command Vc is small, by setting the integral gain Kl to be large to increase the response speed of switching from static friction torque to kinetic friction torque only in a state in which the influence of a lost motion is small, it is made possible to suppress occurrence of stick-slip which occurs in a very low speed region.

Because the speed command including the positional deviation Ep is not fed back to the integral compensator 25, the integral compensator 25 acts to reduce the actual speed deviation El regardless of the positional deviation Ep. Because the speed command including the positional deviation Ep is fed back to the integral compensator 9, the integral compensator 9 acts to reduce the motor speed deviation Em in accordance with the positional deviation Ep. Because the integral gain Kl assumes a sufficiently large value relative to the integral gain Km, and acts to reduce the actual speed deviation El ahead of the positional deviation Ep in a very low speed region, occurrence of positional overshoot is suppressed. Here, because the related art has made it possible to set a high position loop gain Kp, even if the integral gain Km is set to be small in a very low speed region in which the speed command is small, almost no positional deviation Ep is caused to occur.

What is claimed is:

1. A position control device for controlling a position of a feed shaft based on an output of a first position detector connected to a motor and an output of a second position detector connected to the feed shaft driven by the motor, the position control device comprising:
    a position calculator for outputting a speed feedback command obtained from a difference between a position command and the output of the second position detector;
    a position command differentiator for differentiating the position command to output a speed feedforward command;
    a first subtractor for outputting an actual speed deviation which is a difference between the speed feedforward command and an actual speed of the feed shaft obtained from the output of the second position detector;
    a first proportional calculator for performing proportional calculation of the actual speed deviation;
    a first integral compensator for integrating the actual speed deviation;
    a first adder for adding the speed feedforward command and the speed feedback command to output a speed command;
    a second subtractor for outputting a motor speed deviation which is a difference between the speed command and a motor speed obtained from the output of the first position detector;
    a second proportional calculator for performing proportional calculation of the motor speed deviation;
    a second integral compensator for integrating the motor speed deviation; and
    a second adder for adding an output of the first proportional calculator, an output of the second proportional calculator, an output of the first integral compensator, and an output of the second integral compensator to output a torque command,
    wherein each of the first and second integral compensators comprises a coefficient changer capable of changing a coefficient in accordance with the speed feedforward command or the speed command.

2. The position control device according to claim 1, wherein
    the coefficient changer of the first integral compensator changes the coefficient such that the coefficient increases as the speed feedforward command or the speed command decreases, and
    the coefficient changer of the second integral compensator changes the coefficient such that the coefficient increases as the speed feedforward command or the speed command increases.

* * * * *